May 16, 1967 K. J. RHEAD 3,320,538

CARRIER DETECTION DEVICE

Filed June 27, 1963

INVENTOR.

Kenneth J. Rhead

BY

Pendleton, Neuman, Seibold & Williams

Att'ys

United States Patent Office 3,320,538
Patented May 16, 1967

3,320,538

CARRIER DETECTION DEVICE

Kenneth J. Rhead, Denver, Colo., assignor to United Air Lines, Inc., Chicago, Ill., a corporation of Delaware Filed June 27, 1963, Ser. No. 290,973
9 Claims. (Cl. 325—487)

This invention relates to a carrier detection device and especially to a carrier detection device adapted to respond to the presence of a carrier frequency within a limited pass band, irrespective of the presence of noise components within.

Carrier detection circuits have been employed in the prior art in "squelch" circuits, which operate to cut off one or more amplifying stages of a radio receiver when, for example, the receiver is being tuned between channels where no carrier frequency is present. Thus any noise signals received at the antenna of the receiver while it is being tuned between channels are inhibited.

In the prior art, carrier detection circuits have been responsive not only to carrier frequencies, but also to noise having frequency components within the band of interest. These circuits have, therefore, not been entirely satisfactory, since they may indicate the presence of a carrier when there is actually no carrier present, or they may indicate the absence of a carrier because of a relatively large amount of noise which tends to obscure the carrier.

In some applications, for example, when the circuit is used as part of a squelch circuit for aircraft radio communication, it is desirable for the squelch circuit to permit full amplification of incoming signals, even if the carrier is of low amplitude, perhaps less than the noise which is received along with it. This is because voice information can be understood even though it may be many decibels below the noise level.

Accordingly, it is an important object of the present invention to provide a carrier detection circuit which is responsive only to frequencies within a predetermined pass band, and is immune to broad spectrum noise.

It is another object of the present invention to provide a carrier detection circuit which is operative to detect the presence of a carrier frequency, even though the amplitude of the carrier signal is less than that of noise signals.

Further and additional objects of this invention will become manifest from a consideration of this specification, accompanying drawings and the appended claims.

In one illustrative embodiment of the present invention, a pair of isolating stages are connected to receive an amplified signal from an IF stage of a superheterodyne radio receiver. The output of each isolating stage is connected to a separate frequency responsive detector circuit each being responsive to a different frequency. One of the detector circuits has an output-frequency characteristic which is peaked on one side of the optimum IF frequency, while the other detector circuit has an output-frequency characteristic which is peaked on the other side of the IF frequency, the two output-frequency characteristics having inverse slopes in the vicinity of the IF frequency. The outputs of the two detector circuits are connected to a gate which passes the greater one of the output signals produced by the two detector circuits to control the gain of one of the amplification stages of the receiver.

For a more complete understanding of this invention reference will now be made to the accompanying drawings in which.

Figure 1:
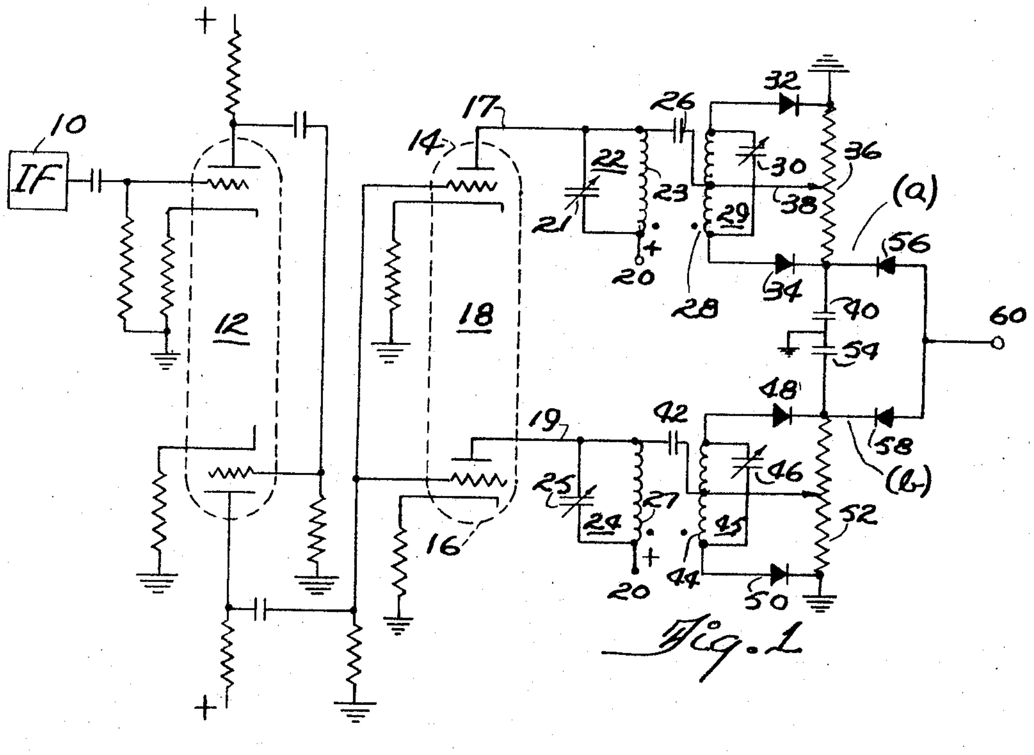
FIG. 1 is a schematic circuit diagram of a first embodiment of the present invention.

Referring now to FIG. 1, the output of an IF stage 10 of a radio receiver is coupled to a conventional two stage RC coupled amplifier, each stage employing one half of the double triode 12. The output of the two stage amplifier 12 is connected to each of a pair of isolating stages 14 and 16, each of which employed one half of a second double triode 18 having anodes 17 and 19.

The plates 17 and 19 of tube 18 associated with the isolating stages 14 and 16 are connected to a source 20 of positive D.C. voltage through individual tuned circuits 22 and 24 respectively. The tuned circuit 22 comprises a capacitor 21 and a coil 23, and is tuned to a first frequency $f_1$, while tuned circuit 24 comprises a capacitor 25 and a coil 27 and is tuned to a second frequency $f_2$. The frequencies $f_1$ and $f_2$ bear a relation to the IF frequency such that $f_1-f_0=f_0-f_2$, where $f_0$ is the IF frequency.

The plate 17 of the isolating stage 14 is also connected through a blocking capacitor 26 to a center tap of a coil 28. The coil 28 is inductively coupled with the coil 23, such that these two coils form a transformer of which coil 23 is the primary and coil 28 is the secondary. A capacitor 30 is connected across the end terminals of the coil 28, and forms therewith a tuned circuit 29 which is tuned to the frequency $f_1$, the same frequency to which the tuned circuit 22 is tuned.

The two ends of the coil 28 are connected to the anodes of the diodes 32 and 34, the cathodes of which are connected to the end terminals of a potentiometer 36. The tap 38 of the potentiometer 36 is adjusted to provide an unequal resistance on each side of the tap, as will be more fully described hereinafter and is returned to a center tap of the coil 28.

With the arrangement illustrated, the voltage induced in one half of the secondary coil 28 is added to that present at the plate 17 of the isolating stage 14, while the voltage induced in the other half of the secondary coil 28 is subtracted from that present at the plate 17 of the isolating stage 14, because of the polarity of the voltage induced in the respective halves of the secondary coil 28.

The two ends of the secondary coil 28 are returned to a center tap on the coil 28 via the diodes 32 and 34, and the upper and lower portions of the potentiometer 36, respectively. The diodes 32 and 34 serve to rectify the voltage induced in each half of the secondary coil 28, and the diode 32 clamps the relatively positive portion of the voltage present at the upper end of the coil 28 to ground. The blocking capacitor 26 isolates the secondary circuit 29 from the D.C. source 20.

The two ends of the secondary coil 28 are connected to the opposite ends of the potentiometer 36, so that the voltage across the potentiometer is the difference between the two voltage magnitudes present at the opposite ends of the secondary coil 28.

The potentiometer 36, however, is adjusted so that its tap 38 is nearer the diode 32 than the diode 34 so that the voltage appearing across the lower portion of the potentiometer 36 is greater than that appearing across the upper portion of the potentiometer 36 when the amplitudes at both ends of the secondary coil 28 are equal, because of the impedance of the tuned circuit 29. The average difference between the voltages across the upper and lower portions of the potentiometer 36 is accumulated in the capacitor 40, which is connected between the two ends of the potentiometer 36.

Figure 2:
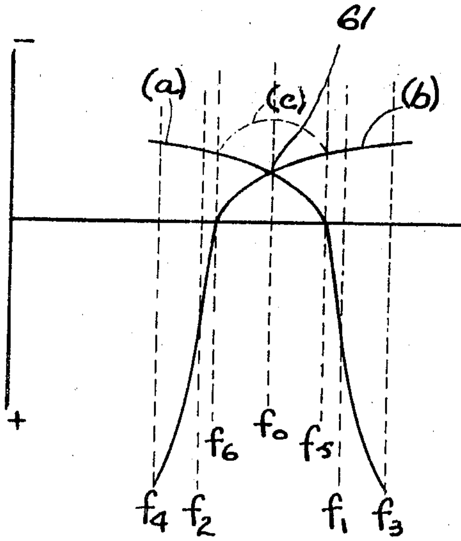
FIG. 2 is a graph of certain output-frequency characteristics of the embodiment of FIG. 1.

The primary circuit 22 and the secondary circuit 29 are tuned to the same frequency $f_1$ (FIG. 2). When the frequency of the signal applied to the primary 22 by the isolating stage 14 is equal to $f_1$, the voltage induced in the secondary 29 is 90° out of phase with that appearing across the primary 22. This is so because at resonance, the secondary impedance is a small resistive impedance, and the back E.M.F. induced in the primary 22 by the secondary current causes the primary circuit 22 to act as though a large resistance were in series with the primary coil 23. Accordingly, the voltage and current in the primary coil 23 are substantially in phase, and the voltage and current in the secondary 29 are also in phase, displaced from the primary current and voltage by 90°, since the secondary voltage is always 90° out of phase with the primary current.

Since the primary and secondary voltages are displaced by 90°, the sum and difference signals existing at the two ends of the secondary coil 28 are equal in amplitude. Therefore, because of the unequal upper and lower portions of the potentiometer 36, a relatively positive voltage appears across the capacitor 40. At frequencies higher than resonance, the output response becomes more positive, since the primary and secondary voltages are out of phase by more than 90°.

At some frequency $f_5$ below resonance, however, the voltage appearing across the upper and lower portions of the potentiometer are equal and therefore no voltage appears across the capacitor 40. When the frequency applied to the primary 22 is less than $f_5$, the primary current lags the primary voltage and, therefore, the primary and secondary voltages are out of phase by less than 90°, and the sum signal is larger than the difference signal.

The potential across the capacitor 40, therefore, becomes sharply more positive for increasing frequencies above $f_5$, and more negative for decreasing frequencies below $f_5$, and its frequency characteristic is illustrated by curve (*a*) in FIG. 2. The upper and lower limits of the pass band are denoted by $f_3$ and $f_4$.

The plate 19 of the isolating stage 16 is connected to a substantially identical detector circuit including blocking capacitor 42, a tuned circuit 45 including a secondary coil 44, and a capacitor 46, a pair of diodes 48 and 50, a potentiometer 52, and an output capacitor 54. This circuit is different from that described above in two respects. First, the tuned circuits 24 and 45 are each tuned to a lower frequency $f_2$, and secondly, the output connection from capacitor 54 and potentiometer 52 is made on the opposite side of the circuit to produce across the output capacitor 54 a voltage which varies with frequency in the opposite manner from that described in connection with the circuit connected to the isolating stage 14. Referring to FIG. 2, the curve (*b*) is a characteristic curve of the circuit including the tuned circuits 24 and 45, and indicates both the different frequencies to which the tuned circuits 24 and 45 are tuned, and the opposite polarity output.

The ungrounded terminals of capacitors 40 and 54 are connected respectively through diodes 56 and 58 to the output terminal 60. The output terminal 60 is preferably connected to an audio amplifying stage (not shown) of the radio receiver, to provide a biasing voltage to inhibit amplification by the audio stages when no carrier is received. It will be appreciated that although the output present at terminal 60 is relatively negative, a relatively positive output may be attained by simply reversing the connections of the coils 23 and 27, and reversing the polarity of the diodes 56 and 58.

The detector circuit which produces the more negative voltage is connected directly through its associated diode 56 or 58 to the controlled stage via terminal 60. The other detector circuit produces a relatively more positive voltage which serves to block its diode, thus permitting only the more negative voltage to communicate with the output terminal 60.

The resulting output at terminal 60, therefore, follows the uppermost (or more negative) portions of the curves (*a*) and (*b*), crossing over from one curve to the other at the point 61, where these voltages are equal. The output thus represents the more negative voltage produced by either of the two detector circuits at any given frequency.

If no carrier is present at the input of the system, but noise is present, the frequency components of the noise signals are practically always distributed throughout the pass band with substantially constant average amplitude. The characteristic curves (*a*) and (*b*) of FIG. 2 each have substantially equal areas above and below the ordinate reference line, and thus noise signals having frequency components above and below the frequency $f_5$ cancel each other out and do not contribute to the voltage across the capacitor 40. Similarly with the other detector circuit, the noise frequency components above and below the frequency $f_6$, where the (*b*) curve crosses the ordinate reference line, cancel out. Moreover, since noise signals normally occur as short pulses, and since the output capacitors 40 and 54 resist any sudden voltage changes, the noise is not manifested in the output at the terminal 60.

Any carrier frequency within the pass band between the limits of $f_4$ and slightly under $f_5$ is detected by the detector circuit including the tuned circuits 22 and 29, but this detector circuit cannot detect higher carrier frequencies within the pass band. Similarly, the other detector circuit detects any carrier frequency between the limits of $f_3$ and slightly over $f_6$, but cannot detect lower carrier frequencies within the band. Between the two detector circuits, however, all frequencies within the pass band are detected. Only one of the detector circuits need be used if only carrier frequencies over a part of the pass band are desired to be detected.

As seen in FIG. 2, the output available at the terminal 60 is flat within 2 or 3 db throughout the entire band so that a carrier frequency may be detected which is located anywhere within the band. The output terminal 60 is connected in circuit with one or more AF stages, so that when a carrier is detected, the output at the terminal 60 permits full amplification by the radio amplifier circuits.

Although the squelch circuit of FIG. 1 has been illustrated as being connected to an IF stage of a receiver, it may instead be connected to an RF stage, in which case the capacitors 21, 30, 25 and 46 are variable, and are adjusted by movement of the tuning control of the receiver.

In some applications, it is desirable that the carrier detection circuit have a greater frequency selectivity in the form of a peaked output-frequency characteristic. A second embodiment of the invention having such a characteristic is illustrated in FIG. 3.

Figure 3:
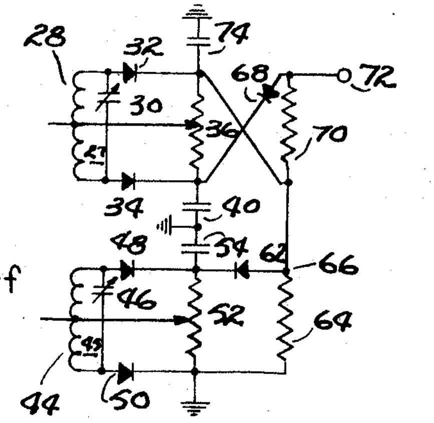
FIG. 3 is a partial schematic circuit diagram of a second embodiment of the present invention.

In the embodiment illustrated in FIG. 3, components which are identical to those illustrated in FIG. 1 are provided with identical reference numerals. However, the manner of connection of the outputs of the two detector circuits is different from that in FIG. 1. In FIG. 3, voltage appearing across the output capacitor 54 produces a current, which flows from the capacitor 54, through diode 62 and resistor 64 to produce, at point 66, a voltage negative with respect to ground. Only if the voltage across the capacitor 54 is negative with respect to ground can such a current flow. The voltage appearing across the output capacitor 40 also produces a current, which flows through diode 68 and resistor 70, and then through isolating capacitor 74 to ground, so as to produce a voltage which is relatively negative at terminal 72 and relatively positive at the end of the resistor 70 which is connected to the diode 32. This current may flow only when the voltage across the capacitor 40 is negative with respect to ground. The two resistors 64 and 70 are connected together so that the voltage appearing at terminal 72 is the sum of the negative voltages appearing at the outputs of each of the detector circuits. The function of capacitor 74, which is connected between the cathode of diode 32 and ground is merely to provide D.C. isolation between the two detector circuits.

The voltages appearing at terminal 72 is illustrated by the dashed line (*c*) in FIG. 2. Dashed line (*c*) indicates the sum of the negative output voltages produced by the two detector circuits, which have the output-frequency characteristics (*a*) and (*b*).

It will be noted from FIG. 2 that the curve (*c*) has a peak at the center of the pass band where the carrier frequency is located when the RF stages are properly tuned. Thus the circuit of FIG. 3 is more responsive to carrier frequencies near the center of the pass band than those near the limits of the band.

Although the carrier detection device of the present invention has been specifically described for use in a squelch system, the signal derived from the carrier detection device may be used in any other desired manner, such as to actuate a relay, ring a bell, or the like. In particular, the device may be used in teletype or data link systems as a carrier detector, when transmitted information is coded either by a shift of the carrier frequency, or by an on-off signal as in CW transmission. The detection device may be employed with both detector circuits, or, alternatively, only a single detector circuit may be employed if one end of the pass band is not needed.

In the illustrated embodiments, when the carrier detection device is intended to detect carrier frequencies within a pass band of 50 kc. having an IF center frequency of about 455 kc., typical values of the components are:

| | | |
|---|---|---|
| 26 | mfd | .055 |
| 32 | | IN34 |
| 34 | | IN34 |
| 36 | megohm | 1 |
| 40 | mfd | .50 |
| 42 | mfd | .005 |
| 48 | | IN34 |
| 50 | | IN34 |
| 52 | megohm | 1 |
| 54 | mfd | .05 |
| 56 | | IN1764 |
| 58 | | IN1764 |
| 62 | | IN1764 |
| 64 | megohm | 1 |
| 68 | | IN1764 |
| 70 | megohm | 1 |

The inductance and capacitance of the tuned primary and secondary circuits 22 and 29 are adjusted to the desired frequency $f_1$, and the tap of the potentiometer 36 is adjusted to give a response characteristic having equal areas on each side of the ordinate reference line. The tuned circuits 24 and 45 are similarly tuned to the desired frequency $f_2$, and the potentiometer 52 is adjusted for noise immunity in the same way as the potentiometer 36.

Without further elaboration, the foregoing will so fully explain the character of my invention that others may, by applying current knowledge, readily adapt the same for use under varying conditions of service while retaining certain features which may properly be said to constitute the essential items of novelty involved, which items are intended to be defined and secured to me by the following claims.

I claim:

1. A signal detector circuit for detecting signals having frequencies between $f_1$ and $f_2$, comprising first and second detectors each having tuned circuit means, impedance means connected to said tuned circuit means, and output means connected to said impedance means, said first detector having an output-frequency characteristic crossing a ordinate reference line at a frequency $f_0$ such that the relation $f_1-f_0>f_0-f_2$ is true, said second detector having a frequency characteristic crossing said ordinate reference line at a frequency $f_0'$ such that the relations $f_1-f_0'<f_0'-f_2$ is true, each of said characteristics having finite value at $f_1$ and $f_2$ and having equal areas within the pass band defined by the frequencies $f_1$ and $f_2$ above and below said ordinate reference line to render said detectors substantially insensitive to noise, and means connected to each of said output means to derive a single control signal in response to a signal having a frequency within said pass band.

2. In a carrier detection system, the combination comprising a pair of frequency modulation demodulators each having an asymmetrical frequency characteristic relative to an ordinate reference line, a source of frequencies within a predetermined pass band, means connecting both of said pair of demodulators to said source, said characteristics crossing said ordinate reference line at different frequencies within said pass band, whereby the areas of said characteristics above and below said reference line within said pass band are equal, and an output terminal connected with both of said demodulators.

3. Apparatus according to claim 2, wherein each of said characteristics is finite at the limits of the pass band.

4. Apparatus according to claim 2, wherein the signs of the slopes of both characteristics are constant within the pass band, and said slopes have opposite signs.

5. Apparatus according to claim 2, wherein each of said demodulators comprises a center-tapped inductance, a first unidirectional current path interconnecting one end of said inductance to said center tap through a first impedance, and a second unidirectional current path interconnecting the opposite end of said inductance with said center tap through a second impedance, said first and second impedances being unequal to produce said asymmetrical frequency characteristic, and means connecting said first and second impedances with said output terminal.

6. Apparatus according to claim 5, wherein said connecting means comprises means connecting one of said first and second impedances of each of said demodulators to a reference potential, and unidirectional current carrying means connecting the other of said first and second impedances of each of said demodulators with said output terminal.

7. Apparatus according to claim 6, including a separate unidirectional current carrying device for each of said demodulators, one said device being connected directly between said output terminal and said other impedance of one of said demodulators, and the other said device being connected through an impedance between said output terminal and said other impedance of the other demodulator.

8. Apparatus according to claim 2 wherein said source comprises an IF stage of a radio receiver for providing frequencies within the pass band of said IF stage.

9. Apparatus according to claim 2 wherein said source comprises an RF stage of a radio receiver for providing frequencies within the pass band of said RF stage.

References Cited by the Examiner

UNITED STATES PATENTS

| | | | | |
|---|---|---|---|---|
| 2,477,963 | 8/1949 | Chapin | 325—487 | |
| 2,773,181 | 12/1956 | Singel | 329—133 | X |
| 3,046,486 | 7/1962 | Rhodes | 325—487 | X |
| 3,082,378 | 3/1963 | Slaton | 329—112 | X |
| 3,096,446 | 7/1963 | Cohen. | | |

KATHLEEN H. CLAFFY, *Primary Examiner.*

R. LINN, *Assistant Examiner.*